(12) United States Patent
Salazar

(10) Patent No.: US 10,427,749 B2
(45) Date of Patent: Oct. 1, 2019

(54) FORK WITH AN ADJUSTABLE LENGTH STEERER TUBE

(71) Applicant: Nicholas M Salazar, Littleton, CO (US)

(72) Inventor: Nicholas M Salazar, Littleton, CO (US)

( * ) Notice: Subject to any disclaimer, the term of this patent is extended or adjusted under 35 U.S.C. 154(b) by 138 days.

(21) Appl. No.: 15/679,964

(22) Filed: Aug. 17, 2017

(65) Prior Publication Data

US 2018/0065707 A1   Mar. 8, 2018

Related U.S. Application Data

(60) Provisional application No. 62/384,543, filed on Sep. 7, 2016.

(51) Int. Cl.
| | |
|---|---|
| *B62K 21/22* | (2006.01) |
| *B62K 3/10* | (2006.01) |
| *B62K 19/32* | (2006.01) |
| *B62K 21/16* | (2006.01) |

(52) U.S. Cl.
CPC .............. *B62K 21/22* (2013.01); *B62K 3/10* (2013.01); *B62K 19/32* (2013.01); *B62K 21/16* (2013.01)

(58) Field of Classification Search
CPC ......... B62K 19/32; B62K 21/16; B62K 21/22
See application file for complete search history.

(56) References Cited

U.S. PATENT DOCUMENTS

| 4,410,197 A | * | 10/1983 | St. Hillaire | ............ | B62K 21/16 280/279 |
|---|---|---|---|---|---|
| 7,069,812 B1 | * | 7/2006 | Rettig | ................... | B62K 21/16 280/279 |
| 7,296,813 B2 | * | 11/2007 | Montague | .............. | B62K 15/00 280/276 |
| 7,344,329 B2 | * | 3/2008 | Hutchinson | ............ | B62K 21/22 280/279 |
| 8,215,201 B2 | * | 7/2012 | Schindler | ............... | B62D 1/184 403/109.5 |
| 2003/0110880 A1 | * | 6/2003 | Tison | ..................... | B62K 21/06 74/551.8 |

FOREIGN PATENT DOCUMENTS

CA       2428328  A1  *  11/2004  ............. B62K 21/12

* cited by examiner

*Primary Examiner* — Kevin Hurley
(74) *Attorney, Agent, or Firm* — Leyendecker & Lemire, LLC

(57) ABSTRACT

A bicycle fork having a steerer tube assembly having top and bottom steerer tube sections wherein the length of the steerer tube assembly is adjustable by interchanging top steerer tube sections of differing lengths is described. The top and bottom steerer tube sections include one or more meshing teeth and valleys that facilitates the transfer of torque when the top and bottom steerer tube sections are joined together.

18 Claims, 5 Drawing Sheets

FORK WITH AN ADJUSTABLE LENGTH STEERER TUBE

RELATED APPLICATIONS

This application claims priority to and incorporates by reference U.S. Provisional Patent Application 62/384,543 filed on Sep. 7, 2017 entitled An Aerodynamic Bicycle and having the same inventor.

BACKGROUND

A typical bicycle includes a front fork. The fork is typically comprised of spaced left and right fork blades, a crown and a steerer tube. The proximal ends of the fork blades are secured to the crown and extend downwardly therefrom. The blades-each include a slot at its respective distal end to receive and secure the end of an axle of a front wheel therein. The steerer tube extends generally upwardly from a distal end, which is secured to the center of the crown in between the proximal ends of the fork blades. The crown acts to secure the blades and the steerer tube together. Variations are known. For instance, some front forks have a single mono blade to which a front wheel connects. In other variations, the typically tubular blades are bent or curved inwardly at their proximal ends and welded or otherwise secured directly to the steerer tube eliminating a distinct crown. Suspension forks are also well known wherein multi-part blade assemblies include sprung and/or dampened sliders. Other types of suspension forks are known wherein the steerer tube assemblies are sprung and/or dampened.

The steerer tube is configured by way of a headset to be rotatably received in a head tube of a corresponding bicycle frame. Most typically, the top end of the steerer tube extends above and out of the top of the frame's head tube wherein a stem can be secured there-around. A handlebar is then attached to the stem, which allows a rider to steer the associated bicycle in use. It is to be appreciated that some bikes use handlebars and stems that are combined in a single integral unit.

Forks are typically manufactured with long steerer tubes that are subsequently cut to fit a bicycle frame based on the length of the frame's head tube, the stack height of an associated headset, the length of the stem clamp, and the desired height of the stem to properly fit the bicycle to the particular body dimensions of the rider. If the steerer tube is mistakenly cut too short, it cannot be used in the intended frame and will have to be discarded or retained for possible later use in another frame with a shorter head tube. In practice many mechanics cut the steerer tube a little bit longer than necessary and use spacers placed underneath or above the stem clamp to vary the height of the stem relative to the frame. Typically, the amount of adjustment is limited to less than an inch, which may not be sufficient in some circumstances.

DETAILED DESCRIPTION

Embodiments of the present invention comprise a fork, typically for bicycles, having a steerer tube assembly wherein the length of the steerer tube assembly is adjustable by interchanging tubular top sections of differing lengths.

Essentially, the steerer tube assembly comprises a bottom steerer tube section and an top steerer tube section wherein the sections include a Hirth joint or other joint of intermeshing teeth that permits the transfer of torque between the sections when the sections are secured by a suitable threaded fastener. By using top steerer tube sections of different lengths, the fork can be used in bicycle frames having head tubes of different lengths.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

As used herein, "bicycle" refers to any at least partially human powered vehicle. While bicycles usually have two wheels, tricycles are also to be considered bicycles for purposes of this disclosure.

As used herein, "stem" refers to both traditional bicycle stems and integral stem and handlebar combinations.

An Embodiment of a Fork with an Adjustable Length Steerer Tube Assembly

Figure 1:
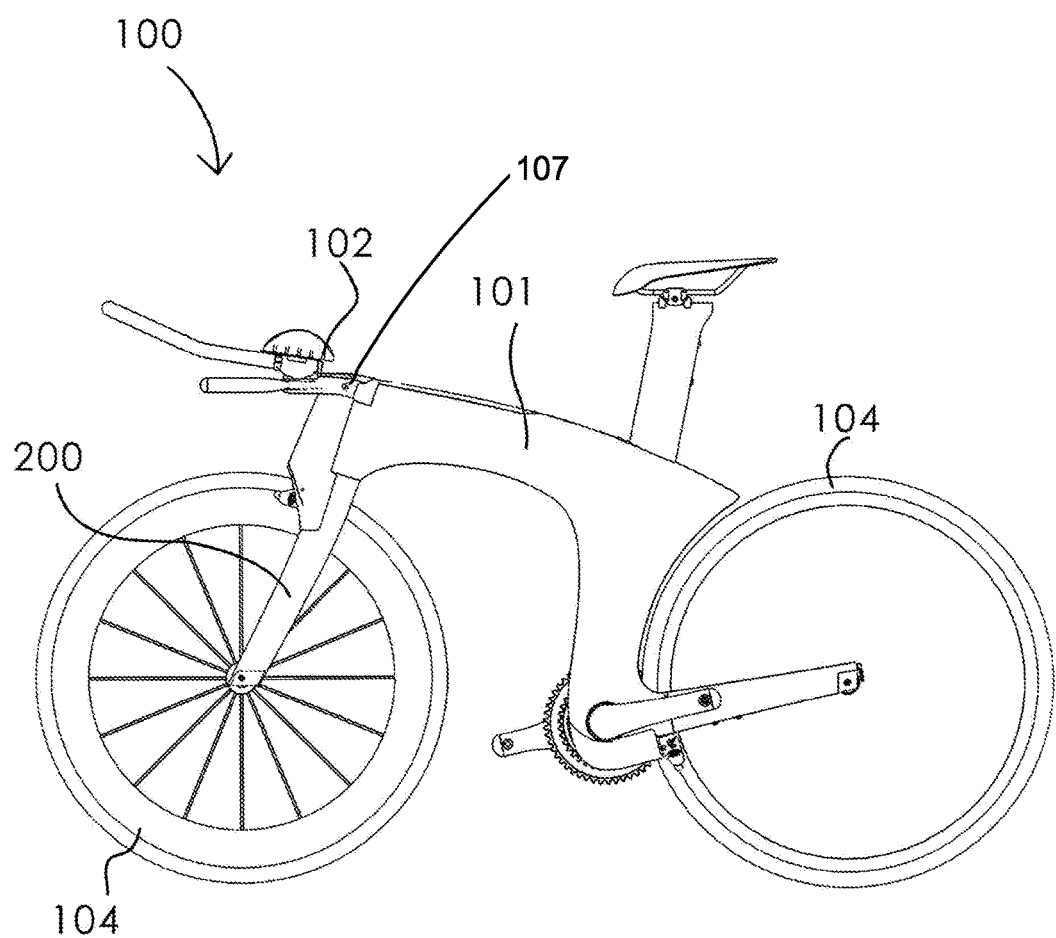
FIG. 1 is a side view of a bicycle including a fork with an adjustable length steerer tube according to one embodiment of the present invention.

FIG. 1 is an illustration of an aerodynamic bicycle configured primarily for triathlons and time trials. The bicycle comprises a frame 101, a fork 200 rotatably attached to the frame, a pair of wheels 104 with a front wheel attached to the fork and a rear wheel attached to the frame, and a stem assembly 102 attached to the fork including a handlebar permitting a rider to change the direction of the bicycle. Other typical elements of a bicycle include a seat or saddle and a drive train.

Figure 2:
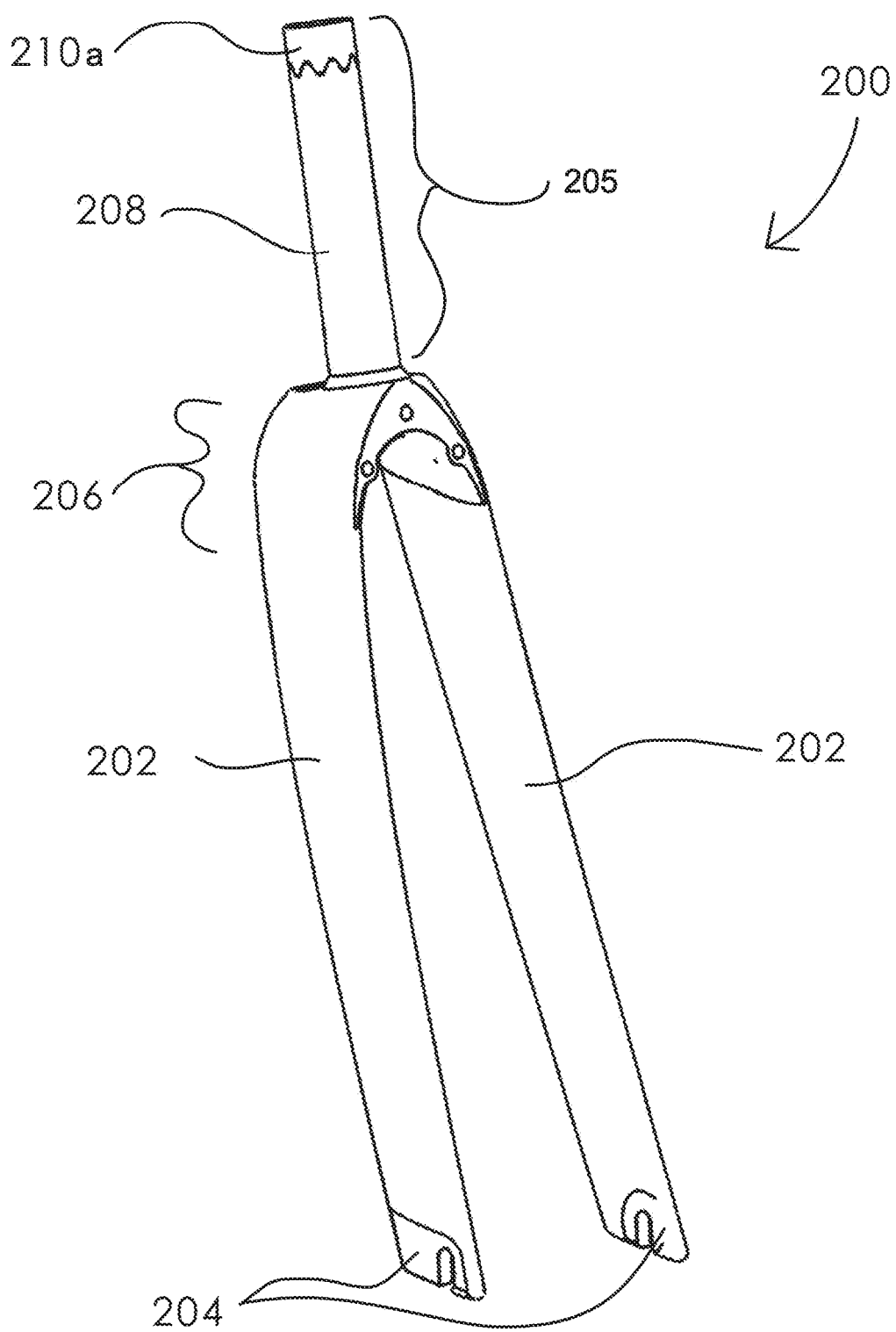
FIG. 2 is a perspective view of a fork with an adjustable length steerer tube according to one embodiment of the present invention.

A fork 200 according to embodiments of the present invention is illustrated in FIG. 2 and comprises a pair of spaced left and right fork blades 202 each having an aligned slot 204 at a distal end to receive the axle of a wheel therein. The proximal ends of each blade typically terminates at a crown 206. The crown can be an integral part of the fork blade's distal end or it can be a distinct component that receives the fork blade therein. A steerer tube assembly 205 extends upwardly from the center crown. The steerer tube assembly's primary components include a bottom tube section 208 and a top tube section 210a.

Figure 3A:
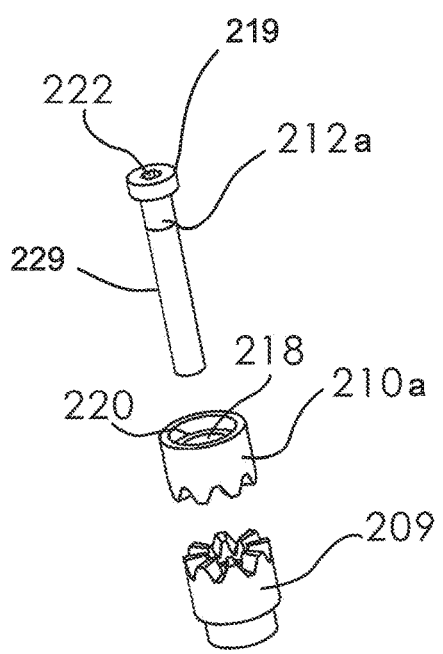
FIGS. 3a and 3b are partial perspective exploded views of the steerer tube assembly of a fork according to one embodiment of the present invention.
Figure 3B:
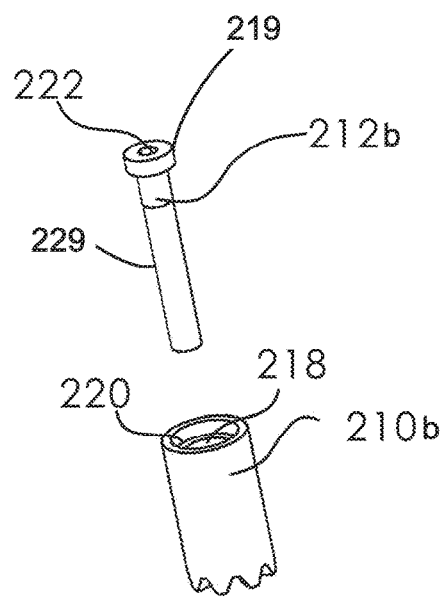
Figures 4A, 4B:
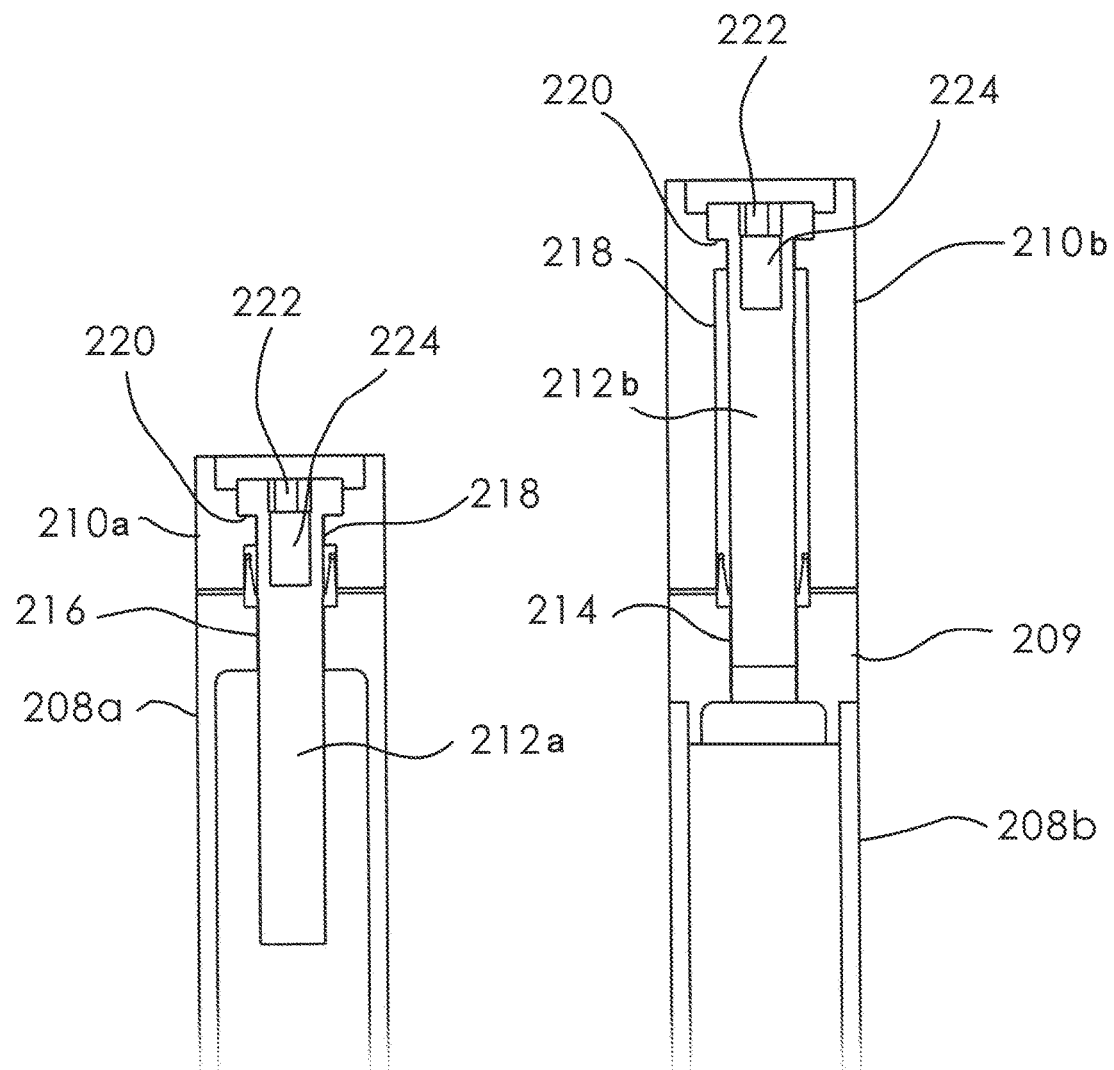
FIGS. 4a & 4b are cross sectional views of the steerer tube assembly at the interface of the top and bottom steerer tube sections according to one embodiment of the present invention.

The steerer tube assembly is shown in greater detail in exploded view FIGS. 3a and 3b and in the cross sectional views of FIGS. 4a & 4b. In FIG. 3a, the bottom tube section comprises two parts: a bottom tube 208a and a bottom Hirth joint piece 209. The bottom Hirth joint piece is typically cast, machined or otherwise formed and then one or both of interference fit and adhesively bonded into the top of the bottom tube. The bottom Hirth joint piece, which is typically comprised of a steel or aluminum alloy, includes a threaded center bore orifice 214. The bottom tube can comprise any suitable materials including steel, carbon fiber composite and aluminum alloy. The distal or bottom end of the bottom tube is attached to the fork blades 202 typically by way of the crown 206.

In contrast, the bottom tube section shown in FIG. 3b is comprised of a single unitary bottom tube 208b typically machined out of a solid rod of aluminum or steel and having a bottom Hirth joint and threaded center bore orifice 216 at its top or proximal end. The distal end of the unitary bottom tube is joined to the fork blades 202 in a similar fashion as the two piece bottom tube section assembly described in reference to FIG. 3a.

The first and second top steerer tube sections 210a & 210b in FIGS. 3a and 3b are similar except the second top steerer tube section of FIG. 3b is longer than the first top steerer tube section of FIG. 3a. Each is typically machined, cast or otherwise formed with a bottom surface comprising a Hirth joint portion configured to interface with the corresponding Hirth joint portion of the bottom tube section 208. A longitudinally-orientated orifice 218 extends through the first or second top steerer tube section as can be better seen in cross sectional views FIGS. 4a and 4b. The longitudinally-orientated orifice is coincident with a longitudinal axis of the first or second top steerer tube section and is accessible from the proximal end of the top tube and includes a circumferential shoulder 220 against which the fastener head 219 of a first or second securing fastener 212a & 212b can seat.

The first or second securing fasteners 212a & 212b of FIGS. 3a and 3b are also similar although they can vary in length as necessary for use with top tube sections of differing length. The first or second securing fastener includes a fastener head 219 and a threaded shaft 229. Although not specifically illustrated, at least a distal portion of the threaded shaft is typically threaded to be threadably received in the threaded center bore orifice of the bottom tube section. The securing head as shown includes a socket head recess 222 to receive a hex key (also known as an Allen wrench) therein to tighten and loosen the first or second securing fastener.

In some variations, the securing fastener 212 includes an internally threaded bore 224 extending at least partially longitudinally there through and is accessible from a top surface of the fastener head. The threading is provided below the socket head recess. After the securing fastener 212 has been tightened and a stem has been installed over the steerer tube assembly, a stem cap can be placed over the end of the stem clamp 107 and the stem cap securing bolt used to hold the stem cap in place can be threaded into the securing fastener.

Figure 5:
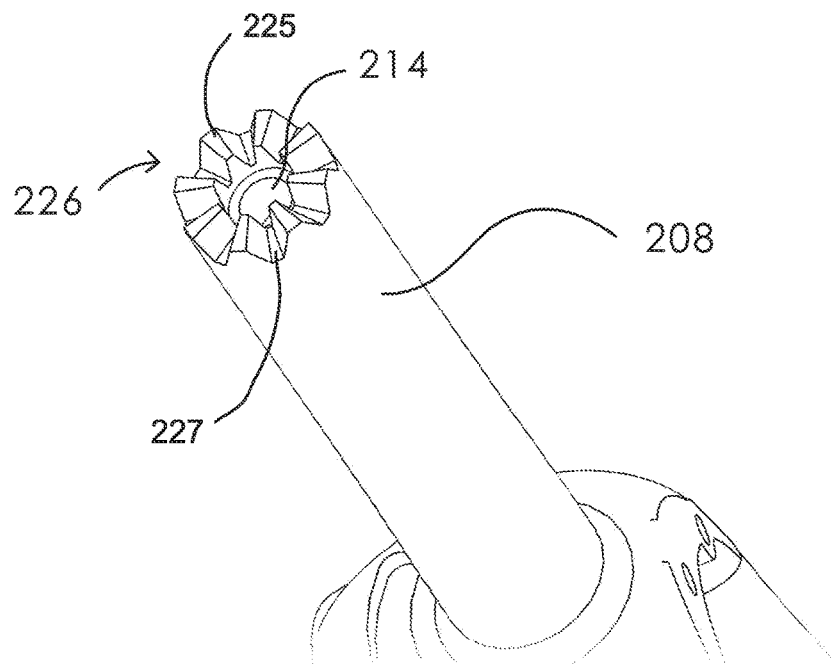
FIG. 5 is a perspective view of the top of the bottom tube section showing the bottom tube's portion of the Hirth coupling according to one embodiment of the present invention.

As indicated, a Hirth joint is used with the associated securing fastener 212 to functionally couple the bottom and top steerer tube sections 208 & 210a or b together wherein torque can be transferred between the bottom and top tube sections. A face 226 of one half of a typical Hirth joint is shown in FIG. 5 illustrating the top or proximal end of the bottom steerer tube section. As can be seen, the threaded center bore orifice 214 is provided at the center of the bottom Hirth joint face. A Hirth joint consists of a two mating surfaces at the end of a shaft or tube. Each mating surface comprises a set of longitudinally projecting teeth 225 and associated valleys 227 between the longitudinally projecting teeth wherein both the longitudinally projecting teeth and valleys extend radially and have angled faces. The resulting serrated mating surfaces mesh and interlock with the other, and when secured in place with a securing fastener, transfer torque between the joined shaft sections.

As can be appreciated, different configurations of longitudinally projecting teeth and associated valleys on the respective tube sections other than Hirth joints can be used in variations and other embodiments of the top and bottom steerer tube sections.

Installation of an Embodiment of a Fork Having an Adjustable Steerer Tube Assembly Because the steerer tube assembly comprises a top and a bottom steerer tube sections 210 & 208 that are functionally joined together, the effective length of the steerer tube assembly can be changed by exchanging top steerer tube sections 210 of different lengths. By substituting a first top tube section for a second or third top tube section of differing lengths, the fork can be used in frames having differing head tube lengths 106. Additionally, the flexibility offered by adjustability of the steer tube assembly's length permits a rider to adjust the relative height of a stem and the associated handlebars. For instance, a rider might decide after assembling and riding a bike that his/her stem and handlebars are too low. Using prior art forks, if the fork had been cut to length, the rider would have had to replace the entire fork assembly. With embodiments of the present fork assembly, the rider can replace the shorter first top steerer tube section 210 with a longer second or third top tube section, place spacers between the top of the headset and the underside of the stem clamp and re-secure the stem clamp in place without even having to fully remove the fork from the frame. Conversely, the reverse can be done to lower the stem should the height thereof later be determined to be too high.

Figure 6:
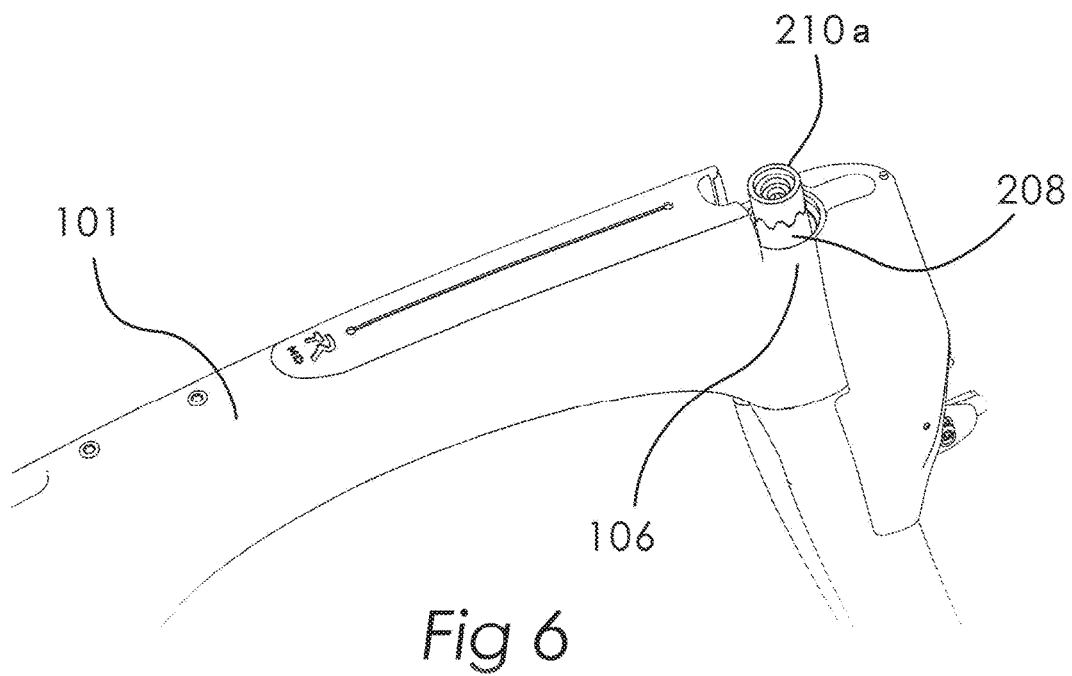
FIG. 6 is a perspective illustration showing the steerer tube assembly received in a head tube of a bicycle frame according to one embodiment of the present invention.

To adjust the length of the steerer tube assembly, the stem and/or stem assembly 102 is removed from the portion of the top steerer tube section by loosening the stem clamp and pulling it off as applicable. The upper portion of the headset is removed from the frame's head tube and the top steerer tube section. A portion of the front end of the bicycle 101 is illustrated in FIG. 6 showing the head tube 106 and bottom and top steerer tube sections 208 & 210 after the stem and upper portion of the headset have been removed.

Next, the securing fastener 212 is unscrewed and removed typically using a hex key. The top steerer tube section 210 is then lifted off of the bottom tube section 208 and set aside. A new top steerer tube section is selected that is either longer or shorter than the previous section as desired and the new top steerer tube section is placed on top of the top or proximal end of the bottom steerer tube section. A securing fastener of the appropriate length is passed through the longitudinally-orientated orifice 218 of the top steerer tube section to engage the threaded center bore orifice 214 & 216 of the bottom steerer tube section. The securing fastener is tightened to operatively join the top and bottom steerer tube sections together.

Once the steerer tube assembly is completed, the upper portion of the headset is slid over the steerer tube assembly and against the top of the head tube. Spacers as needed or desired are placed over the steerer tube assembly and then the stem clamp is placed over the steerer tube assembly and secured in place. As necessary all or part of the process can be repeated replacing the top steerer tube section with others of differing lengths.

Other Variations and Alternative Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention. For instance, the exact design and configuration of the apparatus can vary dramatically from the illustrated embodiment utilizing different materials and mechanisms as best adapted for the materials and construction of the apparatus.

Embodiments of the invention described above all relate to bicycles; however, embodiments and variations configured for use with motorcycles are also known.

I claim:

1. A fork for receiving a front wheel thereto, the fork comprising:
   one or more fork blades, each fork blade including a blade proximal and blade distal end, the blade distal end including an opening configured to receive and retain an axle of the front wheel therein;
   a steerer tube assembly including a bottom tube section and a first top tube section,
      the bottom tube section including a bottom tube distal end and a bottom tube proximal end, the bottom tube distal end being operatively coupled with each blade proximal end, the bottom tube proximal end including one of (a) at least one longitudinally projecting tooth and (b) at least one valley, the bottom tube section further including a longitudinally-orientated bottom orifice proximate the bottom tube proximal end, an axis of the bottom orifice being coincident with a longitudinal axis of the bottom tube section,
      the first top tube section including a top tube distal end and a top tube proximal end, the bottom tube distal end including the other of (a) the at least one longitudinally projecting tooth and (b) the at least one valley, the at least one tooth and the at least one valley being configured to mesh when the top tube section and the bottom tube section are operatively joined, the first top tube section also including a longitudinally-orientated top orifice including a circumferential shoulder, an axis of the top orifice being coincident with a longitudinal axis of the top tube section, the top orifice being accessible through the top tube proximal end; and
   a securing fastener with a fastener head and a threaded shaft, the securing fastener being configured to be received through the top orifice with the fastener head butting against the circumferential shoulder and the threaded shaft being received threadably into the bottom orifice.

2. The fork of claim 1, wherein the bottom tube section has a bottom diameter and the first top tube section has a top diameter, and wherein the bottom and top tube diameters are substantially the same.

3. The fork of claim 1, wherein the at least one longitudinally projecting tooth and the at least one valley are arranged along respective circumferences of the first top and bottom tube sections.

4. The fork of claim 1, further comprising a second top tube section, the second top tube section being substantially similar to the first top tube section except having a length different from a length of the first top tube section.

5. The fork of claim 1, wherein the threaded fastener further includes an internally threaded bore extending at least partially longitudinally there through and accessible from a top surface of the fastener head.

6. The fork of claim 1, wherein the one or more fork blades comprise left and right fork blades.

7. The fork of claim 1, further including a crown, the crown coupling each fork blade at each blade proximal end to the bottom tube section at the bottom tube proximal end.

8. The fork of claim 1, wherein the one or more fork blades are one or both of sprung and dampened.

9. The fork of claim 1, wherein the at least one longitudinally projecting tooth comprises a plurality of longitudinally projecting teeth and the at least one valley comprises a plurality of valleys.

10. The fork of claim 9, wherein the plurality of longitudinally projecting teeth and the plurality of valleys comprise a Hirth joint.

11. A fork for receiving a front wheel thereto, the fork comprising:
   one or more fork blades, each fork blade including a blade proximal and blade distal end, the blade distal end including an opening configured to receive and retain an axle of the front wheel therein;
   a steerer tube assembly including a bottom tube section and a first top tube section,
   the bottom tube section including a bottom tube distal end and a bottom tube proximal end, the bottom tube distal end being operatively coupled with each blade proximal end, the bottom tube proximal end including a plurality of spaced longitudinally upwardly projecting first teeth separated by a plurality of first valleys, the bottom tube section further including a longitudinally-orientated bottom orifice proximate the bottom tube proximal end, an axis of the bottom orifice being coincident with a longitudinal axis of the bottom tube section,
   the first top tube section including a top tube distal end and a top tube proximal end, the bottom tube distal end including longitudinally downwardly projecting second teeth separated by a plurality of second valleys, the second longitudinally downwardly projecting teeth and second valleys interfacing with the respective first valleys and the longitudinally projecting first teeth in a meshing relationship, the top tube section also including a longitudinally- orientated top orifice including a circumferential shoulder, an axis of the top orifice being coincident with a longitudinal axis of the first top tube section, the top orifice being accessible through the top tube proximal end;

a first securing fastener with a fastener head and a threaded shaft, the securing fastener received through the top orifice with the fastener head butting against the circumferential shoulder and the threaded shaft being threadably secured into the bottom orifice.

12. The fork of claim 11, wherein the opposing first and second longitudinally projecting teeth and first and second valleys comprise a Hirth joint.

13. The fork of claim 11, wherein the opposing first and second longitudinally projecting teeth and first and second valleys are arranged around the respective circumferences of the first top and bottom steerer tube sections.

14. The fork of claim 11, wherein the first securing fastener further includes an internally threaded bore extending at least partially longitudinally there through and accessible from a top surface of the fastener head.

15. A bicycle comprising a bicycle frame with a head tube, bicycle wheels, and the fork of claim 11 rotatably received in the head tube.

16. The fork of claim 11, wherein the threaded fastener further includes an internally threaded bore extending at least partially longitudinally there through and accessible from a top surface of the fastener head.

17. A bicycle comprising the fork of claim 16, a bicycle frame having a head tube, bicycle wheels, a headset and a stem assembly, the fork being rotatably received in the head tube, a stem clamp of the stem assembly being received over and secured to the first top tube section.

18. A method of adjusting the height of a stem assembly on the bicycle of claim 17, the method comprising:

providing a second top tube section, the second top tube section being substantially similar to the first top tube section but having a longer length;

providing a second securing fastener, a second securing fastener being longer than the first securing fastener;

loosening the stem clamp and removing the stem assembly from the first top tube section;

unthreading the first securing fastener from the bottom tube section;

pulling the first top tube section off of the bottom tube section;

fitting the second top tube section over the bottom tube section;

threading the second securing fastener through the second top tube section and into the bottom orifice and tightening the second securing fastener; and installing the stem clamp over the second top tube section and tightening the stem clamp.

* * * * *